United States Patent [19]

Luce

[11] Patent Number: 5,049,256

[45] Date of Patent: Sep. 17, 1991

[54] RECOVERY OF HYDROCARBONS FROM ACID SLUDGE

[75] Inventor: Mark C. Luce, Napa, Calif.

[73] Assignee: Chevron Research and Technology Company, San Francisco, Calif.

[21] Appl. No.: 475,627

[22] Filed: Feb. 6, 1990

[51] Int. Cl.$^5$ ............................................ C10G 17/06
[52] U.S. Cl. ..................... 208/13; 208/332; 210/633; 210/639; 210/751; 210/765; 210/772; 210/806; 210/908
[58] Field of Search .............. 210/633, 634, 639, 751, 210/765, 768, 772, 806, 908, 909; 208/13, 332

[56] References Cited

U.S. PATENT DOCUMENTS

| | | | |
|---|---|---|---|
| 1,525,016 | 2/1925 | Weir | 208/13 |
| 2,028,185 | 1/1936 | Bird | 208/13 |
| 2,185,951 | 1/1940 | Rostler et al. | 208/13 |
| 4,040,958 | 8/1977 | Rammler | 210/772 |
| 4,057,486 | 11/1977 | Meadus et al. | 210/633 |
| 4,801,384 | 1/1989 | Steiner | 210/634 |

*Primary Examiner*—Stanley S. Silverman
*Assistant Examiner*—Krisanne Shideler

[57] ABSTRACT

Hydrocarbons are recovered from acid sludge by mixing the sludge with methyl ethyl ketone and base. A hydrocarbon-rich methyl ethyl ketone stream and a solids-containing stream are separated from the mixture, and a hydrocarbon stream is separated from the hydrocarbon-rich methyl ethyl ketone stream.

10 Claims, 1 Drawing Sheet

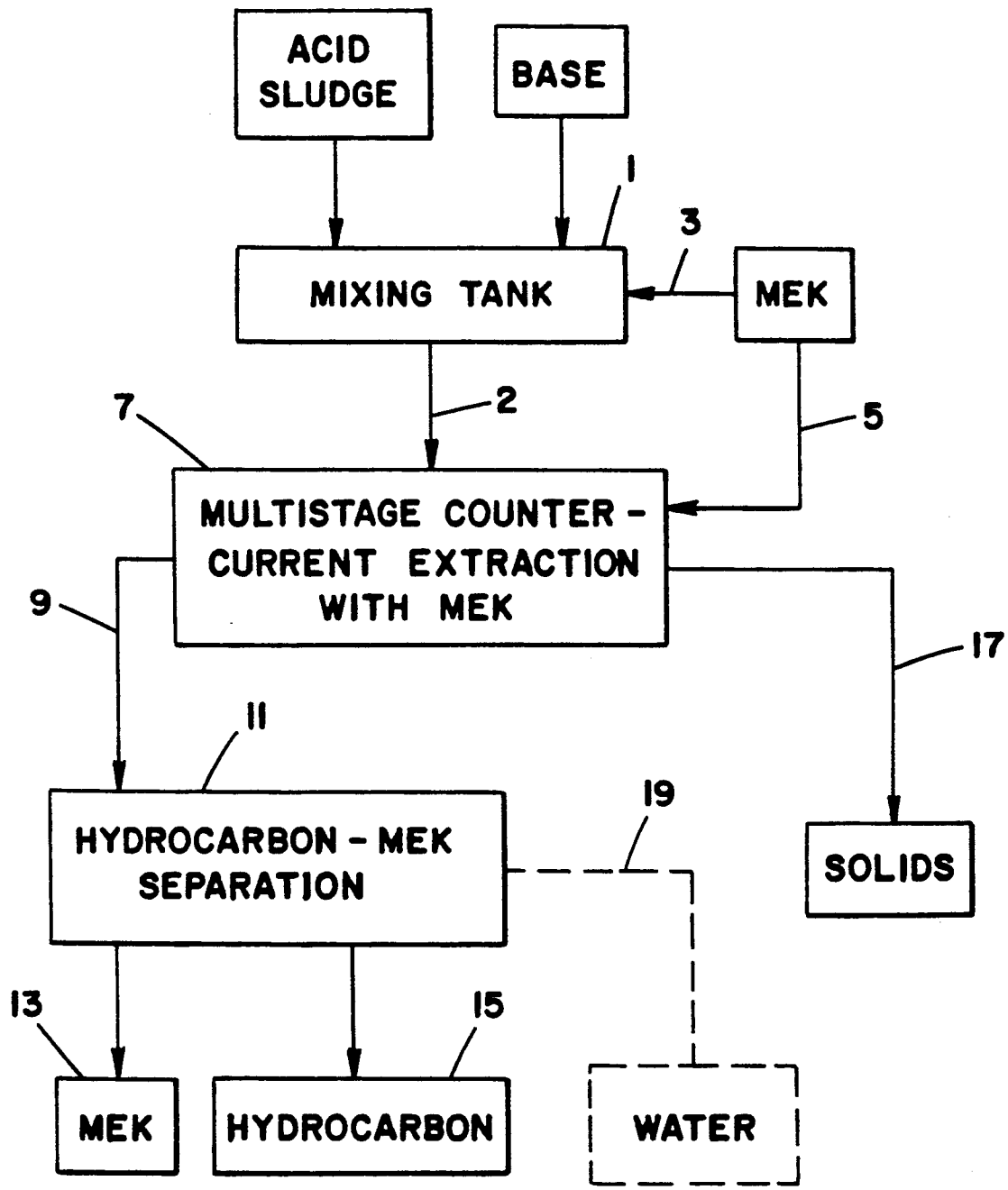
FIG_1

RECOVERY OF HYDROCARBONS FROM ACID SLUDGE

FIELD OF THE INVENTION

My invention relates to a process for the neutralization and recovery of hydrocarbons from acid sludge, in particular, acid sludge which has been removed from a disposal site, such as a landfill where it has been stored for a long period of time. Such sludges typically have a low pH, i.e., are extremely acid, and have been produced at refineries by the acid treatment of heavy petroleum fractions to produce lubricating oils and other products. Such acid sludges are typically tarry materials, apparently consisting of an emulsion on high-sulfur, high-nitrogen petroleum, with sulfuric acid and various solids. Neutralization of the acid bodies in acid sludge is extremely difficult due to the presence of tar. The presence of polynuclear aromatics makes it especially important to obtain a purified solid product for easy and safe disposal.

BACKGROUND OF THE INVENTION

Refinery acid sludges were created when crude oils and lubricating oil precursors were contacted with high concentrations of sulfuric acid to extract sulfur, oxygen and nitrogen-containing constituents that would otherwise be unstable. Air may have been bubbled through the acid-petroleum mixture and a precipitate formed. This process was prevalent some 30–40 years ago. Such precipitates, i.e., acid sludges, were for some years disposed of in surface impoundments (pits). The aged acid sludge is a tarry mass which must now be removed from the disposal site and permanently disposed of or recycled. One method of disposal of oily waste is claimed in copending application Ser. No. 379,408, filed July 12, 1989, by P. S. Sundar. In the Sundar process, which is not adapted to acid waste, one adds solids and a binder, such as portland cement to an oily waste to form granules. The purpose of the Sundar process is not neutralization of the oily waste which is substantially neutral to begin with. The granules are contacted with a solvent to obtain a solvent-granules mix. A solvent-hydrocarbon phase is then separated from the solvent-granules mixture by solvent extraction. Limestone is a preferred solid added to oily waste in Sundar's process as an inert or substantially inert absorbent material. Other fillers may be used in place of limestone in the Sundar process, such as, fly ash, catalyst fines, etc. Methyl ethyl ketone is disclosed to be a solvent for that granulated solid process. A preferred method of Sundar's process contacts the granular mass with the solvent in a multi stage countercurrent flow in which the granular mass travels in one direction and the solvent travels in another. The direct neutralization of acid sludge with a solid base, such as limestone, is not possible because of the semi-solid tarry nature of the acid sludge. Furthermore, the treatment of acid sludge with base, such as limestone, produces substantial amounts of heat and gas while the treatment of a substantially neutral oil waste does not.

ASTM Test Method D94 determines the amount of constituents in a petroleum product that will saponify under conditions of the test. In this test a known weight of the sample is dissolved in methyl ethyl ketone (MEK) and is heated with a known amount of KOH. The excess alkali is titrated with acid and the saponification number of the sample calculated. Vapors from this method can cause flash fires.

U.S. Pat. Nos. 4,073,719 and 4,073,720 discloses the refining of used waste lubricating oil and crankcase oils by vacuum distillation to strip water and volatiles, mixing the stripped oil with a solvent comprising alcohol and methyl ethyl ketone to precipitate a sludge, separating the sludge to recover a partially purified oil, and separating the oil from the solvent before vacuum-distilling the oil. U.S. Pat. No. 4,152,528 discloses a process for extracting phenol from a phenol-water mixture using methyl ethyl ketone as a component of the extracting medium. U.S. Pat. No. 3,929,586 discloses a process for removing organic solvents from solvent-containing waste sludges by mixing said sludge with an alkali or alkaline earth base to form a mixture of pH greater than 7 from which the solvent is distilled. Such solvents include methyl ethyl ketone. U.S. Pat. No. 4,801,384 discloses a process for decontamination of sludges contaminated with organic materials by leaching the solid sludge with a leaching solvent, and stripping the organic material from the leaching solvent with a stripping solvent. Such contaminants include polynuclear aromatics, and such leaching solvents include methyl ethyl ketone.

It would be advantageous if tarry acid sludge could be efficiently neutralized. It would be more advantageous if by some process the substantial hydrocarbon content of acid sludge could be recovered for subsequent use, for example, as a component of asphalt. It would be especially advantageous if the solid product of such a process were "delistable", i.e., not on any State or Federal Environmental Protection Agency list of toxic materials. In order to be delistable, the concentration of toxic materials, such as polynuclear aromatics, must be reduced in the product solid to a very low level.

SUMMARY OF THE INVENTION

The acid sludge is neutralized, and treated for recovery of its hydrocarbon content and separation of a disposable solid product. In particular, the acid sludge is contacted with methyl ethyl ketone and a base, such as lime, to form a substantially neutral mixture in the form of a pumpable slurry. The liquid phase of the slurry is separated from the solid by a hydrocyclone, or filter means, or centrifuge, to form a hydrocarbon-rich methyl ethyl ketone liquid and a solid. The solid is preferably further extracted with a methyl ethyl ketone-containing solvent and the extract is added to the hydrocarbon-rich methyl ethyl ketone liquid. The latter portion of the process may be carried out as a multi-stage countercurrent extraction of a solid-containing stream with a methyl ethyl ketone stream moving in opposite directions through successive hydrocyclones and mixing tanks. Residual solvent on the solids is removed using conventional solids drying techniques. The hydrocarbon-rich methyl ethyl ketone liquid is separated into a methyl ethyl ketone phase and a hydrocarbon phase by stripping it with steam. The methyl ethyl ketone phase is saturated with water. Several stages of extraction reduce the hydrocarbon content of the product solid to less than 1 weight percent of the hydrocarbon content of the acid sludge. The water-saturated methyl ethyl ketone may be used as solvent for subsequent batches of acid sludge and base. It is visualized that the process may be operated continuously, as well. The solid product is preferably disposable as a non-toxic solid.

BRIEF DESCRIPTION OF THE DRAWINGS

FIG. 1 shows a flow diagram for the process of the invention.

DESCRIPTION OF PREFERRED EMBODIMENTS

Acid sludge characteristics vary between a soft tar to a hard plastic-like emulsion of sulfuric acid, tar and solids. Extractable oil may comprise in one instance about 65 weight percent, solids may comprise 10 weight percent and water 25 weight percent. The pH of the acid sludge is generally less than 2. Referring to FIG. 1, in the process of the present invention, such acid sludge and base are mixed in a mixing tank 1 with methyl ethyl ketone 3. Hydrocarbon-rich MEK from the solvent extraction of the oily solid (described below) can also be used in the neutralization step, thereby conserving the overall amount of MEK required. The weight ratio of base to sludge is from 0.01:1 to 0.4:1 depending on the choice of base and the acidity of the sludge. The weight ratio of solvent to sludge is about 1:1 or greater. The mixing process may be carried out from 0.5 to 24 hours to form a pumpable substantially neutral slurry 2. While methyl ethyl ketone 3 is the solvent, it is understood that water-containing or aqueous methyl ethyl ketone mixtures, and water-saturated methyl ethyl ketone is included within the meaning of the methyl ethyl ketone solvent in this invention. In particular, it is recognized that methyl ethyl ketone forms an azeotrope with water. By "base" is meant lime, limestone, alkali or alkaline earth base or salts, such as soda ash and other bases. The solvent performs the function of dissolving the acid sludge to permit efficient reaction with the base. The slurry 2 containing the entrained and precipitated solids from the acid sludge is preferably subjected to a multistage, countercurrent solvent extraction 7 with methyl ethyl ketone solvent 5. The hydrocarbon-rich methyl ethyl ketone 9 is separated from the product solid 17. The countercurrent contacting stage comprises, for example, successive stages of mixing tanks for the solid streams and methyl ethyl ketone solvent 5 and hydrocyclones for the separation of the solid stream and the hydrocarbon-rich methyl ethyl ketone stream. By "hydrocarbon" is meant any substantially oily material derived from petroleum. The solids 17 are dried of residual solvent and disposed of. The methyl ethyl ketone and hydrocarbon are separated from the hydrocarbon-rich methyl ethyl ketone by distillation and steam stripping, producing a water-bearing methyl ethyl ketone phase, an aqueous phase, and a heavy hydrocarbon. The aqueous phase is steam-stripped to remove residual methyl ethyl ketone and the water is discharged to a waste water treatment system 19. The hydrocarbon is substantially a heavy oil 15 suitable for use in commercial asphalts or recycle as a refinery feedstock. However, any conventional refining technique may be used, such as distillation. The methyl ethyl ketone solvent 13 is recycled at 3 and 5 to the slurrying process and the extraction process. Alternatively, the water may be recovered from the methyl ethyl ketone and dry methyl ethyl ketone used in the process, but it is clearly advantageous to avoid that extra drying step. Representative conditions, methods and equipment for solid-liquid extraction for the purposes of the present invention are described in Perry's Chemical Engineers Handbook, 4th Ed., R. H. Perry, C. H. Chilton and S. D. Kirkpatrick, co-editors, McGraw-Hill Book Company, New York and are incorporated herein by reference for all purposes. It was noted that the varying amount of water in different samples did not seem to affect the extraction process. Apparently, the presence of water does not significantly interfere with the neutralization/Extraction process.

To test this observation, an extraction using water-saturated methyl ethyl ketone was performed. For the same feed sample, the oil content of the residual solids from a "dry" MEK extraction was 0.45 weight percent, and from a water-saturated MEK extraction it was 0.10 weight percent.

The MEK does not need to be dried prior to recycling to the process as the solvent. This can significantly simplify the solvent recovery portion of the process by eliminating the need for solvent drying.

The process of the present invention can effectively recover greater than 99% of the total oil in the sludge.

Preferably, the hydrocarbon content of the product solid is less than 1 weight percent of the original hydrocarbon content of the acid sludge. Preferably less than 3.5 weight percent of the solid product is residual hydrocarbon. Most preferably, the solid product is dried and is disposable as a nontoxic solid. Preferably, the product solid contains less than 20% of the original polynuclear aromatics content of the acid sludge. In this regard, it was found that methyl ethyl ketone was significantly more effective than another solvent in removing polynuclear aromatics in the present process.

EXAMPLES AND COMPARATIVE DATA

As shown in the following examples, in my invention the solids from the extraction are dried and returned to the site as non-hazardous fill. The solvent, oil, and water mixture is distilled into separate fractions. The oil will be recovered for recycle, the water sent to the waste water treating system, and the solvent recycled to the process.

Over 50 lab-scale extractions were performed, it was determined that the process is capable of producing an oil suitable for recycle and clean non-hazardous solids. In addition, a number of process parameters were evaluated that will impact the design. These results are described below.

SLUDGE NEUTRALIZATION a. Heat Generation and Control

The acid content of the sludge was measured by titration with an organic base, i.e., an ethyl-amine base. It ranged from 4.2 to 12.6 weight percent measured as $H_2SO_4$, with the majority of the samples between 7 and 9 weight percent as $H_2SO_4$.

The heat generated in neutralizing this acid was measured in the lab using excess lime and different solvent-to-sludge ratios. With a 2:1 solvent-to-sludge ratio the highest recorded temperature rise was 34° F. The calculated theoretical temperature rise for this system was 50° F. At a 5:1 ratio both the measured and calculated temperature rise were 25° F.

The temperature rise is mild, and with an appropriate design, should not present a problem. It was also noted that the temperature rise can be influenced by varying the relative amounts of solvent, sludge, and lime.

The vapor pressure of the solvent increases sharply with temperature above 100° F. The expected operating temperature range will be between 90° and 120° F. The reaction bin will be purged with nitrogen and air tight.

b. Off-gas and Venting

The evolution of $H_2S$ during the neutralization reaction was a potential concern. The reaction was carried out in a closed system and no $H_2S$ was detected. As a worse case scenario, samples of raw acid sludge were heated in a closed system. After two hours 0.026 mg $H_2S$ had evolved from a 50-gram sample. Hydrogen sulfide evolution does not appear to be a problem in the neutralization. However, this characterisitic may vary between sludges of different origin.

The volume of gas generated in the neutralization was measured. With a lime addition sufficient to neutralize the acid, 0.6 to 1.0 ml of gas were evolved per gram of sludge treated. The largest gas volumes were recorded between 2 and 5 minutes into the reaction, and the volume decreased as the system cooled. It is not anticipated the volume of gas generated will cause a significant pressure build-up within the vessel. However, the vessel should be vented.

c. Possible Materials of Construction

Corrosion tests using the "free liquid" associated with the untreated sludge were performed to identify appropriate construction materials for the reaction bin. The results are shown below and should be considered relative, not absolute due to the short test period (30 days). It appears that there are many suitable options for the bin material. A carbon steel bin with a protective liner may also be an option.

| Metal | Corrosion Rate mils/year | Appearance |
|---|---|---|
| Hastelloy G | nil | excellent |
| Hastelloy C | 0.3 | excellent |
| Alloy 20 Cb3 | 0.9 | very slight pitting |
| 316 Stainless Steel | 1.3 | no pitting |
| Monel | 7.8 | slight crevice corrosion |
| Carbon Steel | 19.7 | severe pitting |

EXTRACTION AND RECOVERY a. Bench Scale Performance

Initially a series of small (10 to 50 grams of sludge) extractions were performed to determine the required solvent-to-sludge ratio. It was found that ratios greater than 4:1 did not significantly increase the amount of sludge dissolved, and that excess water and lime did not appear to hinder the solvents' ability to dissolve the sludge.

A lab extraction procedure was developed to model the extraction process (see Ex.1). Numerous extractions were performed using four batches of acid sludge from different areas of the landfill. The extracted solids were analyzed.

Table I summarizes the results of the acid sludge extractions. Of the initial mass of sludge, 56 to 68 weight percent of it was recoverable oil and 11 to 14% solids, the rest being water. Samples closer to the dredged bay mud interface are expected to contain more underlying solids and less oil. Greater than 99% of the initial oil in the sample was recovered by the process.

TABLE I

| Sample | Average Feed Composition Weight Percent | | | Oil Content of Residual Solids Weight Percent | Total Oil Recovered Weight Percent of Total Oil |
|---|---|---|---|---|---|
| | Oil | Water | Solids | | |
| 3A | 60 | 29 | 11 | 0.57 | 99.7 |
| 3B | 68 | 18 | 14 | 2.62 | 99.2 |
| 3C | 68 | 21 | 11 | 0.45 | 99.8 |
| 3D | 56 | 31 | 13 | 0.35 | 99.8 |

The solid residues from the acid sludge are light gray and very powdery, indicating most of the oil has been removed. Analysis of the oil content in the solids varied between 0.35 and 2.6 weight percent. The water content ranged from 2.9 to 4.6 weight percent.

The oil was recovered from the oil/solvent/water extract using a simple batch distillation. Due to the very different volatilities of the oil and solvent, the separation was very easy and distinct. The solvent/water mixture from the separation is water white and appears free of oil. The sludge does not appear to contain light ends that would be carried over in the separation.

b. Process Improvements

Significant savings may be realized if the recycled solvent does not have to be completely dry. To evaluate this extraction using water saturated solvent were performed. The oil content of the residual solids was about 0.1 weight percent, while the oil content for the same sludge samples using dry solvent was about 0.45 weight percent. Thus, wet solvent does not adversely affect the extraction process. This allows us to simplify the solvent recovery system and reduce the treatment costs.

c. Materials of Construction

Corrosion was noticed in a lab container used to temporarily store the neutralized oil/solvent extract. This prompted corrosion tests using the extract, the results of which are shown below.

| 30-Day Test Metal | Extract Corrosion Tests | |
|---|---|---|
| | N2 Blanket Corrosion Rate mils/year | Air Corrosion Rate mils/year |
| Hastelloy C | 0.2 | 0.2 |
| 317 Stainless Steel | 2.2 | 1.5 |
| 316 Stainless Steel | 1.9 | 1.4 |
| 304 Stainless Steel | 3.6 | 3.3 |
| Carbon Steel | 2.1 | 4.3 |

The relative rates from the 30-day tests may indicate the presence of organic acids. The materials containing molybdenum (a key element in corrosion resistance to organic acids) showed lower relative corrosion rates than the materials that did not contain Mo (304 s/s and carbon steel).

One set of corrosion coupons was allowed to run for 98 days. The results from this test are considered most representative of possible corrosion to the solvent recovery system.

| 98-Day Test Metal | Corrosion Rate mils/year |
|---|---|
| Hastelloy C | 0.1 |
| 317 Stainless Steel | 0.8 |
| 316 Stainless Steel | 2.3 very slight pitting |
| Monel 400 | 2.5 very slight pitting |
| 304 Stainless Steel | 2.1 |
| Carbon Steel | 0.7 |

The oil/solvent extract appears to be well neutralized, based on the low corrosion levels in all of the metals tested. Carbon steel is an appropriate construction material for the solvent recovery system.

FEED AND PRODUCT STREAMS a. Acid Sludge Characteristics

Acid sludge samples were analyzed for oil/water/solids content and acid content. The results of these analyses, as well as sludge-depth data taken from the boring logs were entered into Techbase, a statistical computer model.

b. Oil Quality (i) Characteristics

The oil recovered by the process is solid at room temperature. It has a shiny surface and is brittle when struck, but malleable if slowly deformed. Its melting point is about 235° F. Table II shows some of the characteristics of the recovered oil for three individual and one composite sample. The characteristics appear to be relatively consistent throughout the site.

The oil is over 50 weight percent asphaltenes. The recovered oil was mixed into asphalt at 1% and 4% by weight. The oil does not show any significant detrimental effects on the quality of the asphalt (and in fact improved its performance in some cases), indicating that recycle into asphalt may be a feasible option.

(ii) Cutter Selection

A series of refinery cuts were tested to assess their ability to fluidize the recovered oil, making it pumpable at lower temperatures. A cutter will aid in handling the oil as it is recycled. The most effective cutters were light and heavy cycle oil (which are commonly used to cut asphalt) and different side cuts from two crude units.

A 2:1 mixture of light cycle oil to recovered oil remained fluid at 110° F. When cooled to ambient temperature, the mixture was semi-solid. Therefore, it appears that with a cutter the recovered oil can be handled at lower temperatures.

TABLE II

Recovered Oil Characteristics

| | Sample | | | |
|---|---|---|---|---|
| | Composite | 1 | 2 | 3 |
| Asphaltenes, wt % | 55.3% | 59.8% | N/A | N/A |
| Sulfur, wt % | 4.6% | 4.5% | 3.6% | 3.1% |
| Nitrogen, wt % | 1.3% | 1.2% | 1.5% | 1.5% |
| Acid Content | | | | |
| as mg KOH/gm | 57 | 54 | 42 | 44 |
| as wt % $H_2SO_4$ | 4.96% | 4.65% | 3.63% | 3.81% |
| Metals (ppm) mg/kg | | | | |
| Al | | | 67.4 | 73.3 |
| As | | | 10.8 | 1.7 |
| Ba | | | 5.4 | 5.9 |
| Ca | | | 2950 | 7180 |
| Co | | | 2.7 | 2.9 |
| Cr | | | 5.4 | 5.9 |
| Cu | | | 4.3 | 4.4 |
| Fe | | | 105.0 | 11.5 |
| K | | | 67.4 | 73.3 |
| Mg | | | 80.2 | 14.7 |
| Mn | | | 1.4 | 1.5 |
| Mo | | | 10.8 | 11.7 |
| Na | | | 51.3 | 84.7 |
| Ni | | | 10.8 | 11.7 |
| P | | | 8.1 | 8.8 |
| Pb | | | 6.7 | 7.3 |
| Pt | | | 53.9 | 58.6 |
| Si | | | 32.5 | |
| SN | | | 8.1 | 8.8 |
| Ti | | | 2.7 | 2.9 |
| V | | | 2.7 | 2.9 |

TABLE II-continued

Recovered Oil Characteristics

| | Sample | | | |
|---|---|---|---|---|
| | Composite | 1 | 2 | 3 |
| Zn | | | 5.4 | 5.9 | c. Solids Characteristics

The extracted solids were sent to Acurex Analytical Labs in Mountain View, Calif. for California hazardous criteria analysis. The results in Table III show that the solids did not demonstrate hazardous criteria.

d. Water Characteristics

The water discharged from the solvent-recovery section will have been distilled twice, and should be of suitable quality to enter the refinery's waste water treatment system. The solvent/water mixture that was distilled off the recovered oil was analyzed for sulfonates. They ranged from 3.7 to 18.0 mg/l. These low levels should not pose a problem for the effluent system.

TABLE III

Characteristics of Residual Solids from Acid Sludge Treatments

| | Sample | | | | |
|---|---|---|---|---|---|
| | 1 | 2 | 3 | 4 | 1 (dup) |
| Weight Percent Oil | 0.57 | 2.62 | 1.09 | 0.20 | 0.77 |
| pH | 3.8 | 4.0 | 3.7 | 4.3 | 3.8 |
| Aquatic Toxicity 96-hr survival @ 1000 ppm | 100% | 100% | 100% | 100% | 100% |
| CAM Metals | | | | | |
| TTLC[1] | pass | pass | pass | pass | pass |
| STLC[2] | pass | pass | pass | pass | pass |
| Volatiles (ppm) detection limits - 2.5 to 10 ppm | | | | | |
| MEK | 34 | 41 | 360 | 290 | 39 |
| Ethyl Benzene | 13 | ND | 17 | 36 | 13 |
| Xylenes | 100 | 8 | 120 | 220 | 108 |
| Semivolatiles (ppm) detection limits - 10 to 100 ppm none detected in any of the samples | | | | | |

[1] TTLC = Total Threshold Limit Concentrations
[2] STLC = Soluble Threshold Limit Concentrations

EXAMPLE 1

An acidic pond sludge was treated by the following procedure. This acid sludge was a hard plastic-like solid emulsion of sulfuric acid, tar and solids. It was originally generated from acid extraction of oil at a refinery.

Initial MODT of the sludge showed:
76.22% Oil
19.73% Water
3.35% Solids

A sample of this sludge (219 g) was dissolved with MEK (878 g) at a 4:1 ratio. This mixture was neutralized with calcium hydroxide at 10% the weight of the solid sludge. After sonication of the sample for 30 minutes, it was poured into 100 ml centrifuge tubes and, centrifuged for 30 minutes. The centrifuged liquid was poured off and the solids were removed and mixed with another 4:1 portion of MEK (another 878 g). The above sonications and centrifuging steps were repeated. Again after centrifuging, the liquid phase was poured off. The solvent was removed by evaporation to yield a recovered oil (122 g) and a solid (50 g). The solids were then dried and MODT'S were done on the dry solids.

The MODT of the dry solids showed:
3.04% Oil
6.18% Water
90.54% Solids

The oil recovered by the process was a solid at room temperature. It has a shiny surface and was brittle when struck, but malleable if slowly deformed. Its melting point is 235° F. Table II shows some of the characteristics of the recovered oil for three individual and one composite sample. The oil was over 50 wt % asphaltenes.

The extracted solids were analyzed for California hazardous criteria analysis. The results in Table III show that the solids did not demonstrate any hazardous criteria. All of the sample passed the acute aquatic toxicity test at 1000 ppm. The total and soluble metal concentrations were well below the hazardous criteria, and no semi-volatile organics were detected. The pH of samples ranged from 3.7 to 4.3, still slightly acidic, but above the hazardous level.

Three volatile organics were detected in the samples; the process solvent in the range of 34 to 340 ppm, xylene up t to 260 ppm and ethyl benzene at 36 ppm. These volatiles would be removed by the steam stripper or dryer, leaving the solids free of volatile organics. The oil remaining in the solids ranged from 0.2 to 2.6 weight percent.

Analysis via Modified Oven Drying Technique (MODT)

The MODT procedure was used to analyze the results in some of the experiments. This procedure determines the amount of light hydrocarbons, oil, water, and solids in oily waste. Light hydrocarbons are all hydrocarbons which volatilize when heated to 230-240° F. for 2-4 hours. "Oil" is defined as those hydrocarbons which are soluble in dichloromethane and do not dissolve in water. "Solid" is defined as material which does not decomposed at 250-300° F. and is not soluble in dichloromethane.

The MODT is a two-stage procedure. In the first stages light hydrocarbons and water are separated from heavy oils and solids by heating in vacuum and by the use of nitrogen as stripper gas. Light hydrocarbons and water are recovered in cold traps and subsequently separated by freezing out the water phase. In the second stage, heavy oils are separated from the solids by Soxhlet extraction with dichloromethane.

EXAMPLE 2

A number of solvents were screened for effectiveness in treating a refinery acid sludge generated from acid extractions of oil. These solvents include toluene, hexane, a mid-distillate from a hydrocracker, diesel oil, triethylamine (TEA), tetrahydrofuran (THF), methylene chloride (CH$_2$Cl$_2$), and MEK. We found the MEK, THF, and CH$_2$Cl$_2$ were effective at dissolving the sludge while the others were not. Dissolving the sludge is important in order to achieve good neutralization.

The screening test consisted of mixing the sludge with the solvent. The mixture was sonicated to ensure good contact and then centrifuged. The liquid was decanted off and filtered. The solids from the centrifuge tube were combined with the filtered solids and were vacuum-dried and weighed. From these weights, the percent of solids extracted could be calculated by the following formula:

$$100 \times \left[ 1 - \left( \frac{\text{dry solids}}{0.811 \times \text{sample wt.}} \right) \right]$$

The 0.811 correction factor was based on drying a 10.03 gm sample of sludge; this gave 8.15 gm of solids indicating the remainder was water and volatiles.

MEK is more attractive than THF and CH$_2$Cl$_2$ as it is already used in other refinery processes. Moreover, MEK is cheaper and safer to use. Bench scale modeling of the process showed that the sludge could be neutralized and treated to obtain recovered oil, clean solids (less than 3 weight percent oil using a 4:1 solvent to sludge ratio), and water.

TABLE IV
SCREENING TEST
SOLVENT EXTRACTION OF ACID SLUDGE

| Solvent | Sample[1] Weight | Solvent Weight | Dry Solids Remaining | Percent Solids Extract | Comments |
|---|---|---|---|---|---|
| NH$_3$ + H$_2$O | 10.12 | 91.13 | 7.6304 | 7.0 | Would not mix |
| Hexane | 10.13 | 69.59 | 5.6922 | 30.7 | Mixed well after sitting for 5 min. |
| MEK | 10.04 | 79.84 | 0.7476 | 90.8 | Mixed well |
| Toluene | 10.08 | 88.25 | 5.4147 | 33.7 | Mixed well |
| THF | 10.24 | 90.65 | 0.1756 | 97.9 | Mixed well |
| Hydrocracker Mid-Distillate | 10.19 | 83.28 | 7.3339 | 11.2 | Mixed very well |
| CH$_2$Cl$_2$ | 10.2 | 93.68 | 0.6696 | 91.9 | Mixed as solvent was being poured |
| Trichloro-Ethane | 10.51 | 92.18 | 3.6944 | 56.6 | Mixed as solvent was being poured |

[1]The sample weight was adjusted using a correction factor which accounted for the moisture and volatiles in the original sample. The factor was 0.811.

What is claimed is:

1. A process for the recovery of hydrocarbons from an acid sludge disposal site containing an aged acid sludge, said aged acid sludge containing up to 13 weight percent slufuric acid comprising the steps of:
   (a) removing said aged acid sludge from said disposal site;
   (b) contacting said aged acid sludge with methyl ethyl ketone and base to form a mixture;
   (c) separating from said mixture a hydrocarbon-rich methyl ethyl ketone stream and a solids-containing stream; and
   (d) separating from said hydrocarbon-rich methyl ethyl ketone stream a methyl ethyl ketone stream, a hydrocarbon stream and a waste water stream.

2. A process according to claim 1 wherein said step (c) comprises a multi-stage countercurrent extraction of said hydrocarbon-rich methyl ethyl ketone steam from said solids-containing stream, followed by drying of the solids to remove residual solvent.

3. A process for the recovery of hydrocarbons from an aged acid sludge, said aged sludge containing up to 13 weight percent sulfuric acid comprising the steps of:
   (a) containing said aged acid sludge with water-containing methyl ethyl ketone and base to form a mixture;

(b) separating from said mixture a hydrocarbon-rich methyl ethyl ketone stream and a solids-containing stream; and (c) separating from said hydrocarbon-rich methyl ethyl ketone stream a water-containing methyl ethyl ketone stream, a hydrocarbon stream and a waste water stream.

4. A process according to claim 3 wherein said hydrocarbon-rich methyl ethyl ketone stream is distilled and steam-stripped to produced said hydrocarbon stream, said water-bearing methyl ethyl ketone stream, and a waste water stream.

5. A process according to claim 1 or 3 wherein said aged acid sludge has a pH of less than about 2.

6. A process according to claim 1 or 3 wherein said aged acid sludge is a mixture of acid, tar and solids.

7. A process according to claim 1 or 3 wherein said base contains lime.

8. A process according to claim 1 or 3 wherein said solid-containing stream contains less than 3.5 weight percent residual hydrocarbon.

9. A process according to claim 1 or 3 wherein said hydrocarbon stream is over 50 weight percent asphaltenes and is mixed into product asphalt at between 1 and 4 weight percent.

10. A process according to claim 1 or 3 wherein said solid-containing stream is dried and disposable as a non-toxic solid.

* * * * *